(12) United States Patent
Stevens et al.

(10) Patent No.: US 9,065,723 B2
(45) Date of Patent: Jun. 23, 2015

(54) UNADDRESSED DEVICE COMMUNICATION FROM WITHIN AN MPLS NETWORK

(75) Inventors: Michael Stevens, Fountain, CO (US); Vonn L. Black, Colorado Springs, CO (US); Mark Barrett, Monument, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 575 days.

(21) Appl. No.: 13/433,031

(22) Filed: Mar. 28, 2012

(65) Prior Publication Data

US 2012/0250519 A1 Oct. 4, 2012

Related U.S. Application Data

(60) Provisional application No. 61/471,568, filed on Apr. 4, 2011.

(51) Int. Cl.
*H04L 12/26* (2006.01)
*H04L 12/723* (2013.01)

(52) U.S. Cl.
CPC ............ *H04L 43/026* (2013.01); *H04L 43/028* (2013.01); *H04L 45/50* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 6,985,488 B2 | 1/2006 | Pan et al. | 370/395.3 |
| 7,263,597 B2 | 8/2007 | Everdell et al. | 712/11 |
| 7,283,563 B1 | 10/2007 | Allan | 370/469 |
| 7,359,328 B1 | 4/2008 | Allan | 370/236.2 |
| 7,385,991 B2 | 6/2008 | Carvajal et al. | 370/397 |
| 7,417,950 B2 | 8/2008 | Hofmeister et al. | 370/230 |
| 7,453,886 B1 | 11/2008 | Allan | 370/395.5 |
| 7,623,449 B2 | 11/2009 | Shabtay | 370/230 |
| 7,668,949 B1 | 2/2010 | Allan | 709/223 |

(Continued)

FOREIGN PATENT DOCUMENTS

| | | | | |
|---|---|---|---|---|
| EP | 1585263 | 10/2005 | | H04L 12/28 |
| EP | 1782572 | 5/2007 | | H04L 12/26 |

(Continued)

OTHER PUBLICATIONS

Rosen et al., "Multiprotocol Label Switching Architecture" Network Working Group, Request for Comments: 3031; Jan. 2001.

(Continued)

*Primary Examiner* — Ian N Moore
*Assistant Examiner* — Latresa McCallum
(74) *Attorney, Agent, or Firm* — JDS Uniphase Corporation (57) ABSTRACT

An unaddressed device installed inline in a path of an MPLS network can communicate a packet from within the MPLS network to an upstream device without knowledge of the necessary MPLS labeling by sending the packet intentionally in the wrong direction: downstream. To communicate to an upstream device, the unaddressed device sends a packet downstream into the MPLS network on the opposite side and through the opposite outgoing port from that which would be used for a packet sent to the same device in a non-MPLS network. This behavior forces the MPLS network, when it next inspects the packet, to re-label it with the correct labeling to route the packet on a path back upstream to the recipient device. In this manner, the MPLS architecture is used to redirect or loop back packets from an unaddressed inline device to the upstream device.

16 Claims, 5 Drawing Sheets

(56) References Cited

U.S. PATENT DOCUMENTS

| | | |
|---|---|---|
| 7,801,130 B2 | 9/2010 | Sheppard et al. ............ 370/389 |
| 7,808,919 B2 | 10/2010 | Nadeau et al. ............... 370/248 |
| 7,839,891 B1 | 11/2010 | Allan .......................... 370/469 |
| 7,848,337 B1 | 12/2010 | Weng et al. .................. 370/401 |
| 2003/0174700 A1* | 9/2003 | Ofek et al. ................... 370/389 |
| 2004/0003094 A1 | 1/2004 | See .............................. 709/227 |
| 2005/0172174 A1 | 8/2005 | Taylor et al. ................... 714/43 |
| 2005/0220072 A1 | 10/2005 | Boustead et al. ............ 370/351 |
| 2005/0259589 A1 | 11/2005 | Rozmovits et al. ......... 370/249 |
| 2005/0276217 A1 | 12/2005 | Gadgil et al. ................ 370/225 |
| 2006/0259966 A1* | 11/2006 | Ilnicki ............................ 726/22 |
| 2006/0262728 A1 | 11/2006 | Addeo et al. ................. 370/248 |
| 2007/0153763 A1 | 7/2007 | Rampolla et al. ............ 370/351 |
| 2007/0165515 A1 | 7/2007 | Vasseur ........................ 370/216 |
| 2008/0049621 A1 | 2/2008 | McGuire et al. ........... 370/236.2 |
| 2008/0062876 A1 | 3/2008 | Giroux et al. ................ 370/235 |
| 2008/0151907 A1 | 6/2008 | Ge et al. .................. 370/395.53 |
| 2009/0003223 A1 | 1/2009 | McCallum et al. .......... 370/244 |
| 2009/0154462 A1 | 6/2009 | Tochio ......................... 370/392 |
| 2009/0296568 A1 | 12/2009 | Kitada ......................... 370/221 |
| 2010/0014431 A1 | 1/2010 | Bajpay et al. ................ 370/242 |
| 2010/0153055 A1 | 6/2010 | Mucha et al. ................ 702/122 |
| 2010/0189115 A1 | 7/2010 | Kitada ......................... 370/400 |
| 2010/0238812 A1* | 9/2010 | Boutros et al. .............. 370/249 |
| 2010/0302973 A1 | 12/2010 | Lange et al. ................. 370/254 |

FOREIGN PATENT DOCUMENTS

| | | | |
|---|---|---|---|
| WO | 2010023510 | 3/2010 | ............ H04L 12/24 |
| WO | 2010023511 | 3/2010 | ............ H04L 12/24 |
| WO | 2010138040 | 12/2010 | ............ H04L 12/56 |

OTHER PUBLICATIONS

Taghizadeh et al., "MPLS Assisted Handover in IP-Based Mobility Management Schemes : A Survey" Second International Conference on Computer Research and Development IEEE 2010.
EP appln No. 12162053.8 Search Report issued Jun. 28, 2012.

* cited by examiner

UNADDRESSED DEVICE COMMUNICATION FROM WITHIN AN MPLS NETWORK

CROSS-REFERENCE TO RELATED APPLICATIONS

The present disclosure claims priority from U.S. Provisional Patent Application No. 61/471,568 filed Apr. 4, 2011, entitled "Communication in an MPLS Network with Unaddressed Devices", which is incorporated herein by reference for all purposes.

TECHNICAL FIELD

The present disclosure relates to methods and apparatuses for an inline unaddressed device to communicate from within an MPLS (Multiprotocol Label Switching) network and, more particularly, how an inline unaddressed eavesdropping or network testing and measuring device can loop back packets in an MPLS network.

BACKGROUND OF THE INVENTION

Monitoring, testing and measuring packet switched IP networks may involve the use of inline unaddressed eavesdropping devices and corresponding controllers to minimize the changes to the network under test.

In non-MPLS networks, such as a purely IP network, replying to a controller's packet may be accomplished by an inline unaddressed eavesdropping device setting the reply packet's destination address as the controller packet's source address then sending the reply packet back upstream towards the controller. The routing architectures of non-MPLS networks ensure that the reply packet will reach the specified destination address. However, within an MPLS (Multiprotocol Label Switching) network, labels, and not IP addresses, control the routing of packets. Because MPLS labels are assigned at the edges of MPLS networks and the labels are different for opposite directions on the same path, there is no existing mechanism for an unaddressed eavesdropping device inline within the MPLS network to originate communications to other devices, for example, sending a reply packet back upstream to its controller.

Multiprotocol Label Switching (MPLS) is a protocol or forwarding mechanism in packet-switched networks that directs data from one network node to the next based on short (e.g. 20-bit) path labels rather than long network addresses (e.g. IPv4's 32-bit addresses or IPv6's 128-bit addresses). MPLS operates at a layer that is generally considered to lie between traditional definitions of layer 2 (data link layer) and layer 3 (network layer) of the OSI (Open Systems Interconnection) model, and thus may be referred to as a "layer 2.5" protocol.

MPLS is designed to determine packet routing paths, in the form of labels, when a packet enters the MPLS network so that subsequent nodes in the path do not incur the costs of making routing decisions at each and every hop. MPLS also allows for more flexible routing of packets and potentially faster routing by internal network nodes because the packet contents do not need to be inspected at each hop. One side effect of concentrating the routing decision-making at the edges routers of an MPLS network is that changing the routing path becomes more difficult after the packet enters the MPLS network. MPLS labels are assigned by the edge routers and describe the path to be taken through the network.

The path to be taken is decided when a packet enters the MPLS network at a Label Edge Router (LER) or ingress router. An LER can consider much more information than a packet's destination address when deciding on a desired path through the MPLS network. LERs are sufficiently aware of the MPLS network topology and sufficiently able to analyze packets and other information to select appropriate routing paths. A packet's routing path is set in the form of labels that are typically pre-pended to the packet.

Labels may describe the selected routing path between distant nodes rather than endpoints or individual hops to the next node. There can be more than one label assigned to a packet and this is generally described as a label stack. MPLS uses different labels for each direction of traffic through a path.

Labels may correspond to IP destinations in networks (similar to traditional IP forwarding), but labels may also correspond to, or may incorporate, other parameters, such as account information based on the routing table entry (e.g. destination, bandwidth, delay, and other metrics), a header field (e.g. source address), Layer 4 socket number information, QoS (Quality of Service), differentiated service, traffic engineering, the status, functionality and load of the network, previous labeling decisions, and any other information available to the network operator and/or the LER. Consequently, MPLS gives network operators a great deal of flexibility to decide how to prioritize and route traffic as it appears at an LER.

Once an LER has set a packet's labeling, the packet may be forwarded through nodes internal to the MPLS network. Generally, no further inspection of the packet contents is necessary until the packet leaves the MPLS network through an egress router, which pops the label and inspects the packet to determine what should be done next. Packet routing decisions at internal nodes are made based on the contents of the label, or the topmost label in a stack of labels, generally without incurring the overhead of examining the packet contents or other labels in the stack, if any.

When a packet is routed through an IP network that does not include MPLS, each node in the network that receives the packet forwards the packet based on a look up of the packet's destination address in its routing table. Each node makes its routing decisions independently of the routing decisions of other nodes and it is generally not possible for a node to influence how a specific packet is routed by other nodes. IP routing tables are typically maintained on each node and are designed so that packets are routed on a path through the fewest nodes or fewest hops. Network congestion, preferential treatment and other factors are not generally considered; rather, each node tries to make its decision independently, based only on the routing table look up. In this way, an IP network that does not include MPLS attempts to minimize the number of routing decisions that must be made (i.e. fewest hops) and minimize the time required for any node to independently make a routing decision.

In contrast, an MPLS network typically incurs most of the routing decision-making costs when a packet enters the MPLS network so that none of the internal nodes need to inspect the packet. In this way, an MPLS network promotes flexibility in selecting a routing path when a packet enters the network, but is inflexible when changes need to be made to the routing path within the MPLS network.

A complete discussion of MPLS networks and their differences over non-MPLS networks is beyond the scope of this disclosure.

Figure 1:
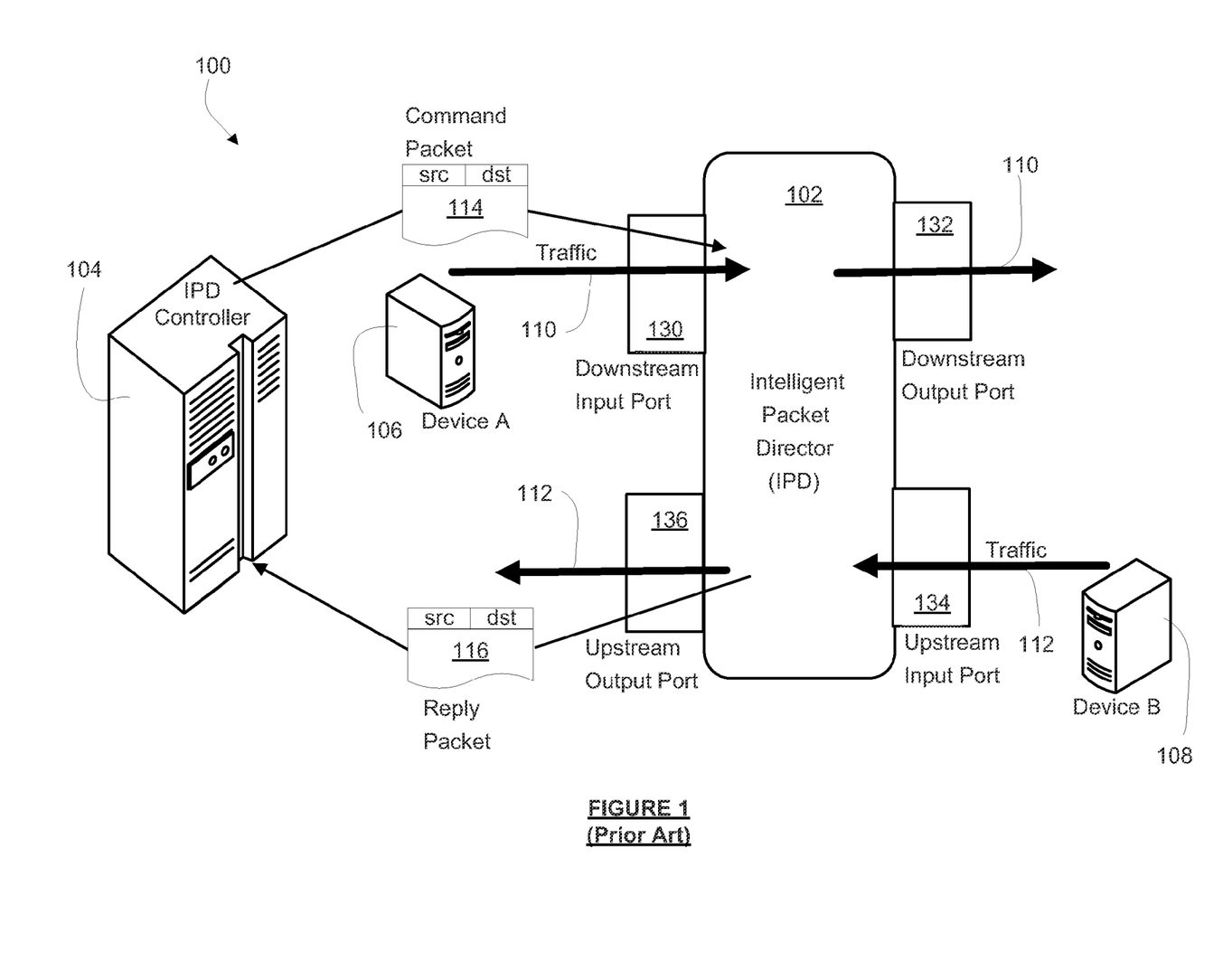
FIG. 1 is a block diagram illustrating an IPD replying to a packet captured in a non-MPLS network.

Referring now to FIG. 1, an existing non-MPLS network 100 is illustrated. Non-MPLS network 100 includes an intelligent packet director (IPD) 102 an IPD controller 104, device A 106 and device B 108.

The IPD 102 is a type of unaddressed device that has a unique identifier and is placed inline into any network path between two nodes (not illustrated). Typically, IPDs 102 surreptitiously inspect both directions of traffic on that path to test, measure or monitor the network. The inline placement of the IPD 102 on a network path means the IPD 102 receives traffic on an upstream side and a downstream side. For simplicity of explanation, this disclosure shall assume the convention that the upstream side is the side from which the IPD last received a packet from a controller containing the IPD's unique identifier. Other conventions or directions of traffic flow are equally within the scope of this disclosure. In this disclosure, upstream and downstream sides are used to denote opposite sides of a device and not intended to limit the location of devices within a service provider's network.

The IPD 102 has four ports to accommodate its inline placement and traffic monitoring in a bidirectional network path. As illustrated in FIG. 1, these four ports are a downstream input port 130 a downstream output port 132, an upstream input port 134 and an upstream output port 136. By inspecting the incoming traffic 110, 112 through both input ports 130, 134, existing IPDs 102 can identify that the IPD controller 104 and device A 106 are upstream while device B 108 is downstream. In the Figures, the upstream and downstream traffic of the various devices have been divided for easier visual identification. Although the IPD 102 is inline on a path between device A 106 and device B 108, A's downstream traffic 110 departing the IPD 102 through port 132 may be destined for any device downstream of the IPD 102, not necessarily including device B 108. Similarly, B's upstream traffic 112 departing the IPD 102 through port 136 may be destined for any device upstream of the IPD 102, not necessarily the IPD controller 104 or device A 106.

After discovery, the IPD controller 104 communicates with the IPD 102 by sending a command packet 114, such as a SmartOptics™ command packet (SOCP), containing the IPD's 102 unique identifier to an address known to be downstream of the IPD 102. In FIG. 1, this device could be device B 108. The command packet 114 may contain commands that are sent from the IPD controller 104 or packet routing engine (PRE) to the IPD 102, commands such as timing, keep alive, etc. The IPD 102 is inline between nodes and recognizes the unique identifier in the command packet 114 that indicates that the packet is intended for the IPD 102. When the IPD 102 identifies its unique identifier in the command packet 114, it consumes the packet 114, removing it from the network, and processes the data of interest in the command packet 114. The IPD 102 associates the source address information (src) from the command packet 114 with the IPD controller 104. In this manner, the IPD 102 can be an unaddressed device (borrowing IP/MAC or other addressing information of any active downstream network device), receive packets 114 from its upstream IPD controller 104 and acquire the address information of the IPD controller 104.

In a non-MPLS network 100, existing IPDs 102 can reply to the IPD controller 104 in the traditional way: sending a reply packet 116 back upstream using the IPD controller's 104 address information as the destination address (dst). If network 100 was a purely IP network, this would simply involve inserting the IP and MAC address of the IPD controller 104 into a response packet 116 sent through the upstream outgoing port 136 of the IPD 102.

Figure 2:
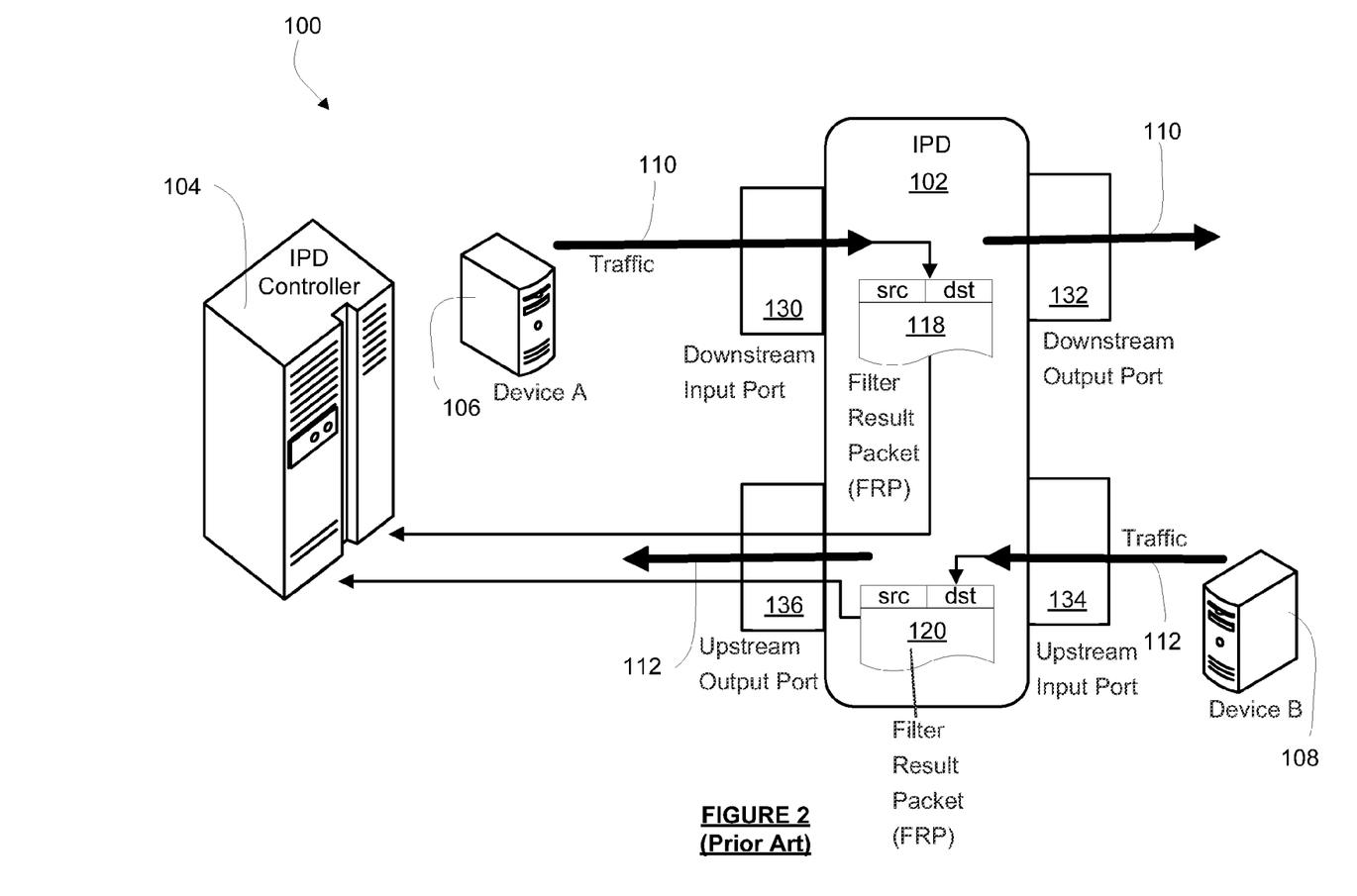
FIG. 2 is a block diagram illustrating an IPD sending data to an IPD controller a non-MPLS network.

Turning now to FIG. 2, the non-MPLS network 100 of FIG. 1 is illustrated in another condition of operation. The IPD 102 surreptitiously inspects incoming traffic 110 from device A 106 and/or incoming traffic 112 from device B 108 for content of interest that matches filters (not shown) loaded into the IPD 102. If a packet of traffic 110, 112 matches a filter, a copy of the packet is taken from the link, as it passes through the IPD 102, and placed into a Filter Results Packet (FRP) 118, 120 corresponding to each of device A 106 and device B 108. As illustrated in FIG. 1, the IPD 102 may receive a command packet 114 (not shown in FIG. 2) instructing the IPD 102 to send back any accumulated filter result packets to the IPD controller 104. Similar to FIG. 1, an FRP 118, 120 packet may be sent back to the IPD controller 104 by sending the FRP 118, 120 out the upstream output port 136 with destination address information (dst) corresponding to the IPD controller 104.

However, if network 100 were an MPLS network, reply packets 116 and FRPs 118, 120 could not be sent directly to the IPD controller 104 by sending those packets back upstream through upstream output port 136. In MPLS, packets are routed based on labeling and not based, for example, on destination IP and/or MAC address information. Labeling is assigned to packets at an edge router or ingress router and may comprise a single label or a stack of labels. Internal nodes in an MPLS network, such as transit routers, do not inspect packet contents. Internal nodes merely look up the label in a label routing table to determine how to forward the packet. Because upstream and downstream labels on a path of an MPLS network are different, it is non-trivial for an existing IPD 102 that is inline on a path of an MPLS network to know the labeling necessary to reply to its IPD controller 104. Further, it is not possible to know this information merely by receiving a command packet 114 from the IPD controller 104. The included IPD controller's address information and the downstream labeling received with the controller's packet is insufficient information to send a reply packet 116 upstream to the IPD controller 104 in an MPLS network. More generally, it is non-trivial for any IPD 102 in an MPLS network to send a packet to a device when the IPD 102 has not already monitored packets being sent to that device from somewhere else in the network and the IPD 102 has recorded the required MPLS labeling.

SUMMARY OF THE INVENTION

According to the present disclosure, an unaddressed device installed inline in a path of an MPLS network can originate communications from within the MPLS network to other devices outside, or within, the MPLS network even if the unaddressed device does not know the MPLS labeling necessary to send packets to that device.

Using communication with its upstream controller as an example, an unaddressed device installed inline in a path of an MPLS network can reply to its upstream controller by sending a reply packet intentionally in the wrong direction. That is, sending the reply packet downstream into the network (on the opposite side and through the opposite outgoing port from that which would be used for a reply packet in a non-MPLS network). This behavior forces the MPLS network, when it next inspects the reply packet, to re-label the reply packet with the correct labeling to route the reply packet on a path back upstream to the controller. In this manner, the MPLS architecture is used to redirect or loop back packets from an unaddressed inline device to its controller.

For simplicity of explanation only, this disclosure provides several examples of communications between an unaddressed device and its controller; however, it is to be understood that an upstream controller is only one example of another device that an unaddressed device inline in an MPLS network can communicate with. It is to be understood that the descriptions, examples and claims in respect of an unaddressed inline device's controller apply equally to any other device.

In this disclosure, an inline unaddressed device (IUD) comprises any device (physical or virtual, separate or integrated) that is connected within a network inline between two addressed devices and is not itself assigned a network address. For example, eavesdropping devices, intelligent packet directors (IPDs), probes, microprobes, SFProbes™ and other network monitoring, measuring or testing devices may be unaddressed devices; however, unaddressed devices may serve any function other than eavesdropping or monitoring network activity and should not be limited by their specific functions. Similarly, unaddressed devices may interact with the network in any manner and should not be limited to specific network interactions other than the ability to communicate with a controller over the network.

In this disclosure, a controller comprises any device in the network that communicates with an unaddressed device. A controller may itself be an unaddressed inline device, so long as the other IUDs in the network are able to predictably send communications to the controller and reliably identify communications from the controller. A controller may control more than one unaddressed device, and there may be more than one controller for each unaddressed device; however, in some embodiments, there is one controller in the network which communicates with, and manages, a set of unaddressed devices in that network, and no other controllers simultaneously communicate with or simultaneously manage those unaddressed devices.

If an unaddressed device is monitoring traffic inline in a path of an MPLS network, and the IUD wants to send communications to one of the devices it identified in that traffic, it must be able to assign the labeling necessary for its packet to be routed to that device. Since the IUD is not aware of how labeling is assigned, and it cannot simply send back a packet using the labeling that it received from that device, it has not been possible for existing IUDs within an MPLS network to originate communications to another device or reply to communications from another device.

An embodiment of the present disclosure provides a method for an unaddressed inline device (IUD) to send a packet to an upstream device in a Multiprotocol Label Switching (MPLS) network, the method comprising: identifying, at the IUD, the upstream device's address information; identifying, at the IUD, a downstream MPLS labeling; preparing, at the IUD, an outgoing packet having destination address information corresponding to the upstream device's address information and MPLS labeling corresponding to the downstream MPLS labeling; and sending, at the IUD, the prepared outgoing packet downstream from the IUD; whereby, downstream of the IUD, the MPLS network re-labels the outgoing packet in accordance with the outgoing packet's destination address information and sends the re-labeled outgoing packet upstream to the upstream device.

Some further aspects of the above embodiment of the present disclosure, include receiving, at the IUD, an incoming downstream packet containing the upstream device's address information and identifying, in the received packet, a unique identifier associated with the IUD; receiving, at the IUD, an incoming downstream packet containing the downstream MPLS labeling; receiving, at the IUD, a packet from the upstream device wherein the upstream device's address information and the downstream MPLS labeling is identified from the packet while the outgoing packet's MPLS labeling is set to the downstream MPLS labeling by copying the packet into the outgoing packet and the outgoing packet's destination address information is set to the upstream device's address information by swapping the source and destination addresses of the outgoing packet. The above embodiments may further include monitoring, at the IUD, incoming packets of upstream and downstream devices and copying a monitored incoming packet into the outgoing packet in response to the monitored packet matching filters stored in the IUD and/or waiting for an idle period in outgoing downstream traffic from the IUD before sending the prepared outgoing packet. In yet further aspects of the above embodiment, the upstream device comprises a controller for managing the unaddressed device.

Another embodiment of the present disclosure provides an unaddressed device for inline placement in a Multiprotocol Label Switching (MPLS) network comprising at least one of a logic array, a gate array, an integrated circuit, a field programmable gate array a complex programmable logic device and any combination of those elements for implementing any of above described methods and their various aspects.

A further embodiment of the present disclosure provides an unaddressed device for testing and monitoring network traffic when in an inline placement in a Multiprotocol Label Switching (MPLS) network. The unaddressed device comprises: a processor for executing computer readable instructions; a non-transitory memory for storing computer readable instructions; and computer readable instructions. The computer readable instructions including: identifying an upstream device's address information; identifying a downstream MPLS labeling; preparing an outgoing packet having destination address information corresponding to the upstream device's address information and MPLS labeling corresponding to the downstream MPLS labeling; and sending the prepared outgoing packet downstream from the unaddressed device; whereby, downstream of the unaddressed device, the MPLS network re-labels the outgoing packet in accordance with the outgoing packet's destination address information and sends the re-labeled outgoing packet upstream to the upstream device.

Some further aspects of the above embodiment of the present disclosure may include computer readable instructions for receiving an incoming downstream packet containing the device's address information and identifying, in the received packet, a unique identifier associated with the unaddressed device; receiving an incoming downstream packet containing the downstream MPLS labeling; receiving a packet from the upstream device containing the upstream device's address information and the downstream MPLS labeling; copying the packet into the outgoing packet, thereby setting the outgoing packet's MPLS labeling to the downstream MPLS labeling; and swapping the source and destination addresses of the outgoing packet, thereby setting the outgoing packet's destination address information to the upstream device's address information. Further aspects of the above embodiment of the present disclosure may include computer readable instructions for monitoring incoming packets of upstream and downstream devices; and copying a monitored incoming packet into the outgoing packet in response to the monitored packet matching filters stored in the unaddressed device and/or waiting for an idle period in outgoing downstream traffic before sending the prepared outgoing packet. In yet further aspects of the above embodiment, the upstream device comprises a controller for managing the unaddressed device.

Where alternative embodiments and additional aspects of those embodiments are described in the present disclosure, these embodiments and aspects may be combined in any manner within a single embodiment unless the present disclosure suggests otherwise. While preferred embodiments may be illustrated or described herein, they are not intended to limit the invention. Rather, numerous changes including alternatives, modifications and equivalents may be made as would be understood by the person skilled in the art. As always, the invention is defined by the appended claims.

BRIEF DESCRIPTION OF THE DRAWINGS

Embodiments of the present disclosure are described with reference to the following figures.

DETAILED DESCRIPTION

Figure 3:
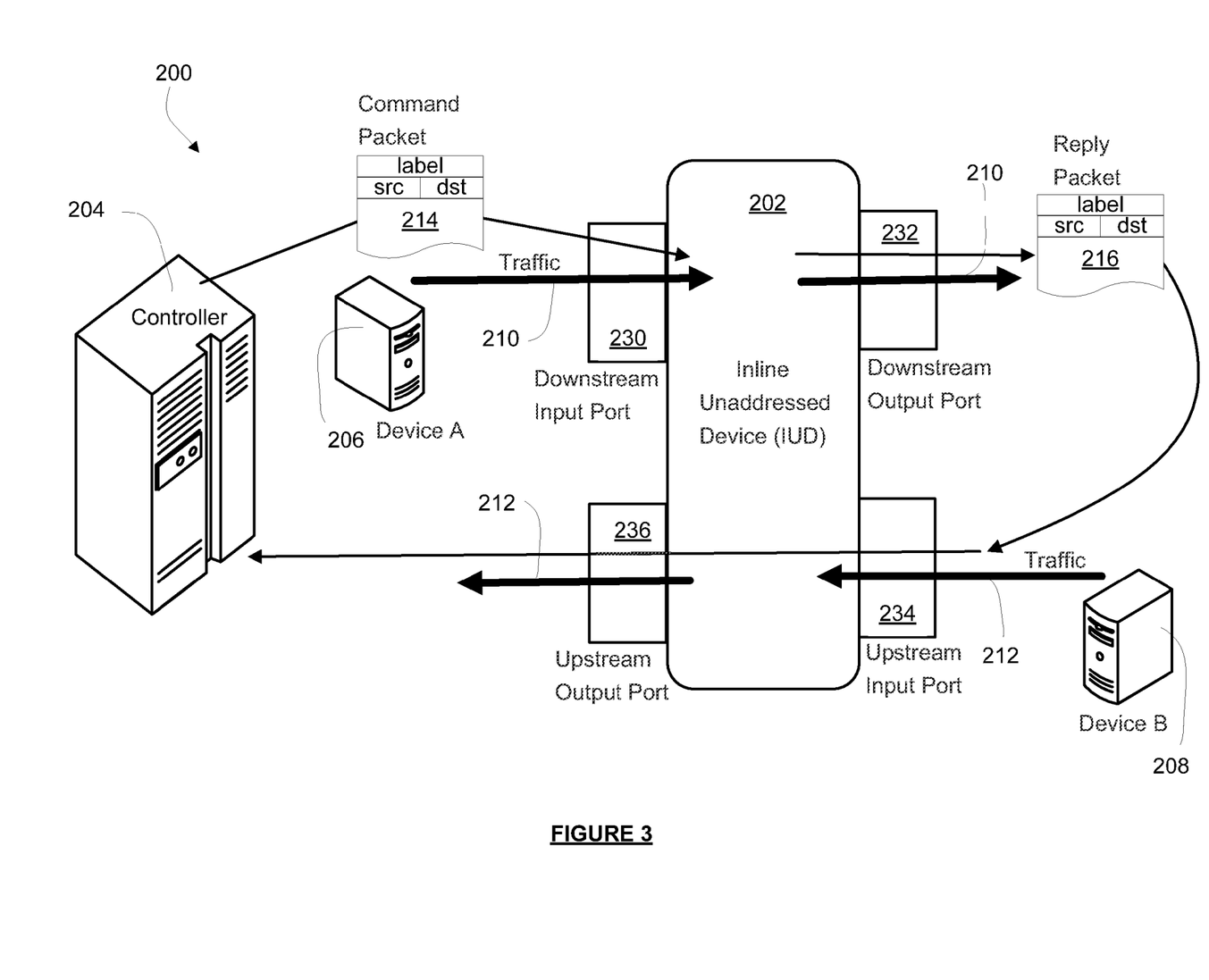
FIG. 3 is a block diagram illustrating an IUD replying to a packet captured in an MPLS network according to the present disclosure.

Turning now to FIG. 3, a system according to the present disclosure is illustrated in an MPLS network 200. The MPLS network 200 may comprise any packet based network including Multiprotocol Label Switching. The MPLS network 200 includes an inline unaddressed device (IUD) 202. A controller 204, device A 206 and device B 208 can pass packet traffic through the path of the MPLS network 200 in which the IUD 202 is inline; however, the controller 204, device A 206 and device B 208 may or may not be within the MPLS network 200.

The inline unaddressed device (IUD) 202 is placed inline on a path within network 200 between any two nodes (not shown) of MLPS network 200. Similar to the IPD 102, the IUD 202 has four ports to accommodate its inline placement and traffic monitoring in a bidirectional network path. As illustrated in FIG. 3, these four ports are a downstream input port 230 a downstream output port 232, an upstream input port 234 and an upstream output port 236. The IUD 202 may include processors for executing computer readable instructions, a non-transitory memory for storing computer readable instructions and other hardware and software features such as packet inspectors, filters, buffers, RAM, ROM and other memory structures, I/O devices, etc. The IUD 202 may also include a logic array, a gate array, an integrated circuit, a field programmable gate array, a complex programmable logic device and any combination of those elements for implementing embodiments of the present disclosure. The IUD 202 may comprise an eavesdropping device, an Intelligent Packet Director (IPD), a microEthernet Probe, a transceiver, a small form factor pluggable (SFP), an SFProbe™ or other inline device that inspects bidirectional traffic of the path in which it is placed. The IUD 202 may be a physically separate device, part of an integrated device or a virtual device present on another device in the network. A function of the IUD 202 may be to monitor and test the operation of the network at the point where it is placed inline while minimally disturbing the network under test; however, the IUD 202 may perform any other functions and need not be limited to eavesdropping, monitoring or testing network traffic on its inline path.

The controller 204 for communicating with and managing the IUD 202 may be located within the MPLS network but is more likely located outside the MPLS network. By convention in this application, the controller 204 and any other device to which the IUD 202 communicates is described as upstream of the IUD 202. The controller 204 may comprise an Intelligent Packet Director Controller (IPD Controller) a Packet Routing Engine (PRE) or other device for controlling and managing the IUD 202. The controller 204 may also be an unaddressed device which borrows an upstream IP address of another device and intercepts packets based on its own unique identifier. The controller 204 may be a physically separate device, part of an integrated device or a virtual device present on another device in the network. A function of the controller 204 may be to monitor and manage one or more IUDs 202; however, the controller 204 may perform any other functions and need not be limited to monitoring and managing IUDs 202. In some embodiments, the controller 204 may not control or manage the IUD 202 but merely be a device that receives packets from an IUD 202 which has been configured to send packets to the controller 204. This may be useful, for example, if the IUD 202 identifies malicious packets and would want to immediately inform a network operator's personal device.

Device A 206 may be any device accessible through the MPLS network 200 where some of device A's outbound traffic 210 passes downstream through the IUD 202 by being received at the IUD 202 through the downstream incoming traffic port 230 and being sent out the IUD 202 through the downstream outgoing traffic port 232. Similarly to device A 206, device B 208 may be any device accessible through the MPLS network 200 where some of device B's outbound traffic 212 passes upstream through the IUD 202 by being received at the IUD 202 through the upstream incoming traffic port 234 and being sent out the IUD 202 through the upstream outgoing traffic port 236. Device B 206 may be within the MPLS network or outside of it. device B 206 may also be a downstream device whose MPLS path labeling and/or address information is borrowed by the IUD 202 so that the controller 204 can send packets to the IUD 202.

In operation, the IUD 202 parses the incoming packets and identifies it is connected inline in a path of the MPLS network 200 between two nodes (not illustrated). Accordingly, labels appended to each packet passing through the IUD 202, and not destination IP or MAC address information within each packet, determine packet routing within the MPLS network 200. The IUD 202 receives traffic 210 on at least one upstream label (for example label "C", from upstream device A 206) and traffic 212 on at least one downstream label (for example label "F", from downstream Device B 208). Depending on the MPLS network configuration, there may be multiple upstream and downstream labels that the IUD 202 may receive. By inspecting incoming packets on incoming ports 230, 234, the IUD 202 can identify devices that are upstream or downstream, which labels are used for upstream or downstream traffic from source devices, and which labels may be used to reach some upstream or downstream destination devices.

Returning to FIG. 3, after discovery between the controller 204 and the IUD 202, the controller 204 sends a command packet 214, e.g. an SOCP packet, to the IUD 202. This can be achieved, for example, by using the controller's IP and/or MAC address as the source address (src), device B's IP and/or MAC address as the destination address (dst) and MPLS label "C" (label) is applied to the command packet 214 representing a downstream path from the controller 204 through the IUD 202 towards device B 208. The command packet may be sent by the controller 204 during an idle period in device A's traffic 210. The command packet 214 includes the IUD's unique identifier (not illustrated).

When the IUD 202 inspects the incoming command packet 214, it recognizes its unique identifier identifying that it is the intended recipient of the command packet 214. The IUD 202 intercepts the packet 214, removing or terminating the packet 214 from incoming traffic 210 and processes the data of interest in the packet 214. In the example communication illustrated in FIG. 3, the IUD 202 acknowledges receipt of the command packet 214 by sending a reply packet 216 (for example, a command ACK packet). To achieve this, the IUD 202 constructs a reply packet 216 setting the IP and/or MAC address of the controller 204 as the destination address (dst), maintaining the labeling information (label) from the command packet 214 and sending the reply packet 216 out the outgoing downstream traffic port 232 of the IUD 202 instead of sending the reply packet out the outgoing upstream traffic port 236 as done by existing non-MPLS IPD devices 102. In some embodiments, the IUD 202 waits until there is a reduction in outgoing downstream traffic 210 or an idle period in Device A's traffic 210 to send the reply packet 216 downstream.

Whether the source address (src) of the reply packet 216 corresponds to an upstream device, such as device A 206, or a downstream device such as device B 208 is predominantly irrelevant to the working of embodiments of the present disclosure. In some embodiments, the source address (src) may correspond to an address which the controller 204 may use to respond back to the IUD 202. In some embodiments, the source address (src) may be intentionally set to the address of a device upstream of the IUD 202. In some embodiments, the reply packet 216 may be a copy of the command packet 214 with the source and destination address fields swapped as described in co-pending U.S. patent publication number 2011/0283140 which is herein incorporated by reference if permissible under the laws of this jurisdiction.

By intentionally sending downstream a reply packet 216 having an upstream destination but downstream MPLS labeling, the MPLS network 200 will route the reply packet 216 along the downstream path associated with the packet's labeling until the packet reaches an MPLS egress router or another MPLS network node that inspects the packets contents and identifies this discrepancy. Upon inspection of the packet 216 contents or upon popping the last MPLS label of the packet 216 at an egress router, the discrepancy will be identified because the intended destination (dst) is not on the local network accessible from the downstream MPLS node inspecting the packet. Thus, the discrepancy-identifying node is unable to route the reply packet 216 any further on its own. To resolve this problem, the discrepancy-identifying node of the MPLS network 200 inspects the reply packet 216, re-labels it with the labeling necessary to reach the destination address, namely the controller 204, and redirect the reply packet 216 upstream. In this manner, the reply packet 216 receives the required labeling to be routed upstream to the controller 214. In some embodiments, the re-labeling may apply the same labeling associated with Device B's upstream traffic 212.

Figure 4:
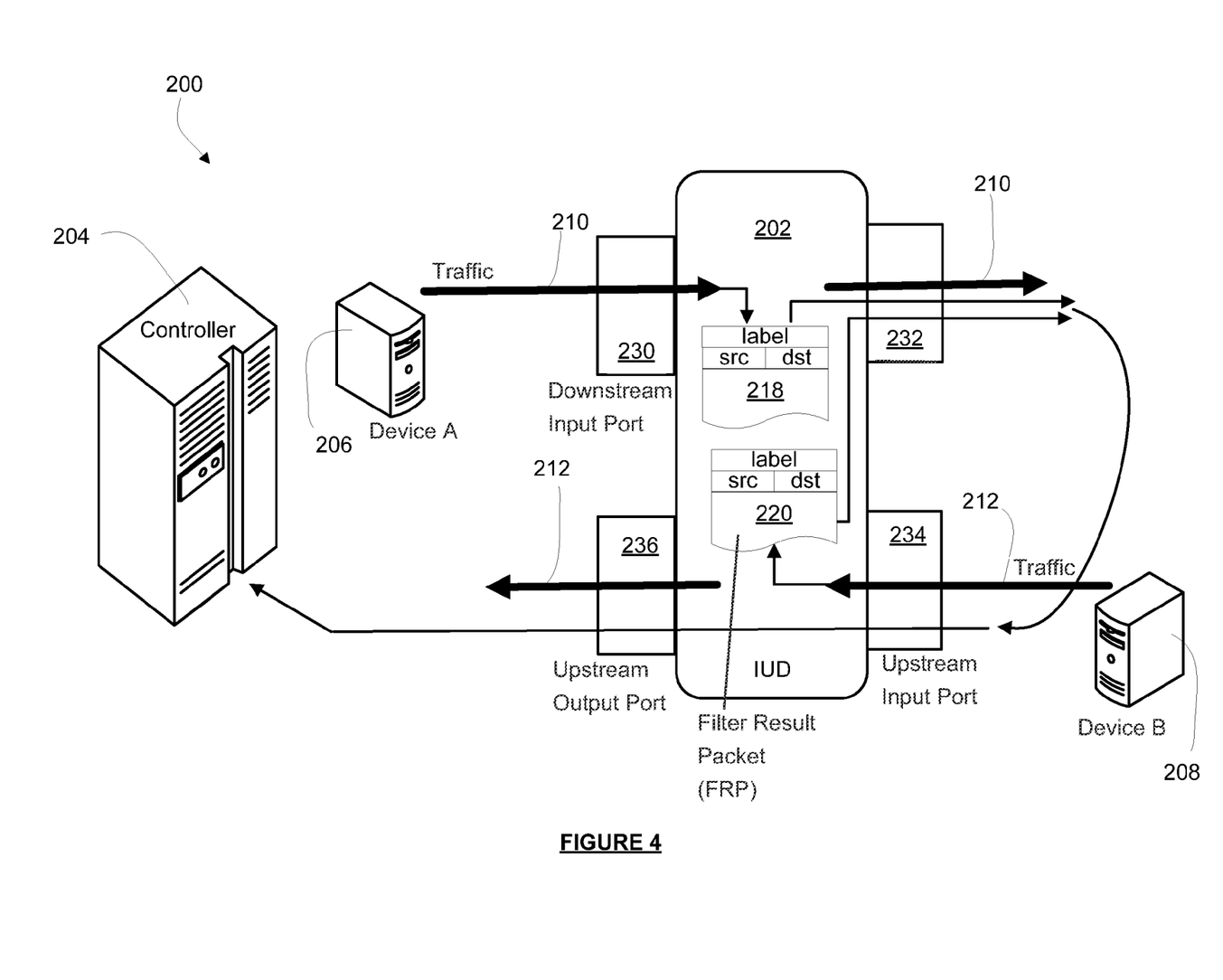
FIG. 4 is a block diagram illustrating an IUD sending data to a controller in an MPLS network according to the present disclosure.

Referring now to FIG. 4, the MPLS network 200 of FIG. 3 is illustrated in another condition of operation. The IUD 202 surreptitiously inspects incoming traffic 210, 212 from device A 206 and/or device B 208 for content of interest that matches filters (not shown) loaded into the IUD 202. If a packet of traffic 210, 212 matches a filter, a copy of the packet is taken from the link, as it passes through the IUD 202, and placed into a Filter Results Packet (FRP) 218, 220 corresponding to each of device A 206 and device B 208. An FRP may be a single packet matching a filter or an amalgamation of multiple packets matching a filter or filters for one or more devices. In some embodiments, any of the packets 216, 218, 220 may be encrypted for security according to known methods.

As illustrated in FIG. 3, the IUD 202 may receive a command packet 214 (not shown in FIG. 4) instructing the IUD 202 to send back any accumulated FRPs to the controller 204. Alternatively, the IUD 202 may send an FRP 218, 220 back to the controller 204 immediately upon collection, periodically without instruction from the controller 204, from time to time when the IUD 202 detects available bandwidth in the relevant traffic stream 210, 212, or upon other conditions.

Similar to sending a reply packet 216, the IUD 202 sends an FRP 218, 220 in the direction opposite the location of the controller 204 by setting the FRP's destination address (dst) to correspond to the upstream controller's address information then sending the packet downstream using downstream MPLS labeling. In this manner, a node of the MPLS network 200 downstream of the IUD 202 will eventually inspect the FRP contents, identify that it cannot route the FRP 218, 220 to the desired destination because the upstream controller 204 is not part of its downstream local network. Accordingly that node will reassign MPLS labeling to the FRP 218, 220 directing the packet back on a path to the controller 204. That return path may or may not loop back through the IUD 202 depending on the other available paths and how the MPLS node performing the re-labeling classifies the FRP 218, 220.

In one example operation of the present disclosure, the controller 204 can send a command packet 214 to the IUD 202 for timing synchronization. The IUD 202 will send back an ACK reply packet 216 based on the timing synchronization command packet 214 from the controller 204. The next command packet 214 from the controller 204 could be a filter set command packet 214 to the IUD 202, for example to filter incoming traffic 210, 212 for packets having an IP address destination (dst) of 10.1.2.3. Once an incoming packet matches the IP destination of 10.1.2.3 filter in the IUD 202, the IUD 202 will make a copy of the packet and send it as an FRP 218, 220 to the controller 204. In a network 100 that does not have MPLS this process is simpler to accomplish; however, as the present disclosure describes, in an MPLS network 200 the IUD 202 sends an ACK reply packet 216 or an FRP 218, 220 into the MPLS network 200 on the opposite side that the last command packet 214 (for example a SOCP) was received to a destination (the controller 204) that the packet 214, 218, 220 cannot possibly reach, therefore forcing the MPLS network 200 that is on the opposite (downstream) side of the IUD 202 to pop the MPLS label (label) and re-label the ACK reply packet 214 or FRP 218, 220 with the correct label to route the ACK reply packet 214 or FRP 218, 220 to the controller 204.

In some embodiments, it is possible that the looped-back FRP 218, 220 passes back through the IUD 202 on its path to the controller, the IUD 202. In such scenarios, the IUD 202 may include logic to identify the looped back FRP 218, 220 to handle it differently than other traffic 210, 212. For example, the IUD 202 may amend its filter conditions to include logical expressions excluding the FRP 218, 220 to avoid matching that packet again.

Sending reply packets 216 and FRPs 218, 220 are merely examples of packet sending function that can be achieved by the systems according to the present disclosure. Other functions for reply packets 216, 218, 220 to the upstream controller or to other devices accessible through the MPLS network 200 are also contemplated within the present disclosure. For example, other IUD functions include monitoring for changes in power of an inline node, temperature of the IUD, error counts and/or other MSA standards and sending an alarm notice to the controller or another networked device if problems are detected.

Figure 5:
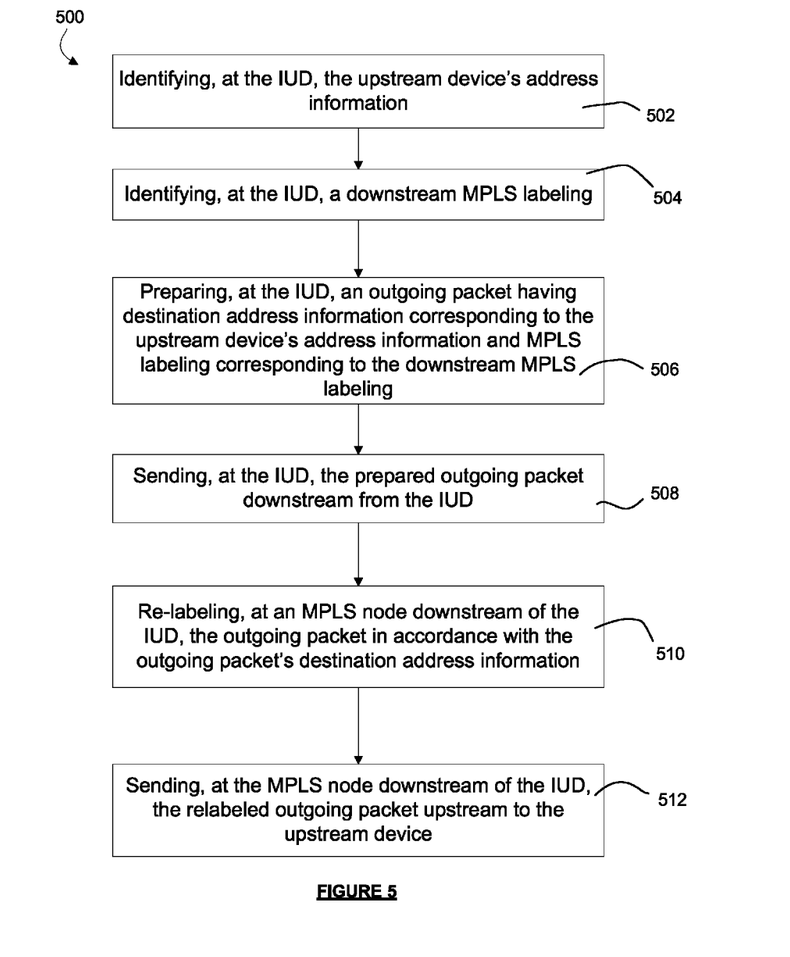
FIG. 5 is a flow chart of an example process according to the present disclosure.

Referring to FIG. 5, an example process 500 for an unaddressed inline device (IUD) to send a packet to an upstream device in a Multiprotocol Label Switching (MPLS) network is illustrated as a flow chart. At action 502, the IUD identifies the upstream device's address information. As described above, Action 502 can include receiving a packet from the controller containing the IUD's unique identifier and the upstream device's address information or receiving a packet directly from the upstream device. At action 504, the IUD identifies a downstream MPLS labeling. Action 504 may include identifying downstream MPLS labeling from the packet received from the controller, from the upstream device or from any other downstream packet. At action 506, the IUD prepares an outgoing packet having destination address information corresponding to the upstream device's address information and MPLS labeling corresponding to the downstream MPLS labeling both of which were identified in actions 502 and 504 respectively. In some embodiments, the outgoing packet of action 506 may be a copy of an incoming packet with the source and destination address information swapped. At action 508, the IUD sends the prepared outgoing packet from action 510 downstream from the IUD. Unlike existing non-MPLS unaddressed devices sending packets back on their upstream output, the prepared outgoing packet is sent in the opposite direction of its intended recipient in effect forwarding the outgoing packet away from its destination. At action 510, an MPLS node downstream of the IUD re-labels the outgoing packet in accordance with the outgoing packet's destination address information. The downstream MPLS node performing action 510 is likely to be an egress router or another MPLS node that inspects the contents of packets it receives. As described above the structure of the outgoing packet and the architecture of the downstream MPLS network will eventually cause the outgoing packet to be re-inspected because its destination cannot be reached from a downstream MPLS node. Upon reaching this conclusion, the downstream MPLS node will re-label the outgoing packet, assigning an appropriate upstream path to the controller. At action 512, the downstream MPLS node will send the relabeled outgoing packet upstream to the upstream controller, thereby completing the looping back of the outgoing packet sent by the IUD.

As known to a person skilled in the art, the devices, controllers, probes and other computer features described in this disclosure may be implemented in hardware, software or a combination of both. They may form part of an independent, distributed, share or other configuration of computing elements capable of storing, accessing, reading and executing transitory and/or non-transitory computer executable instructions.

We claim:

1. A method for an unaddressed inline device (IUD) to send a packet to an upstream device in a Multiprotocol Label Switching (MPLS) network, the method comprising:
   identifying, at the IUD, the upstream device's address information,
      wherein the IUD comprises upstream input and output ports and downstream input and output ports, while not having a network address in the MPLS network, and wherein the upstream device is in communication with the IUD via the downstream input port of the IUD;
   identifying, at the IUD, a downstream MPLS labeling;
   preparing, at the IUD, an outgoing packet which includes destination address information corresponding to the upstream device's address information, associated with MPLS labeling corresponding to the downstream MPLS labeling;
   sending, at the IUD, the prepared outgoing packet downstream from the IUD via the downstream output port; and
   whereby, downstream of the IUD, the MPLS network re-labels the outgoing packet in accordance with the outgoing packet's destination address information by replacing the downstream MPLS labeling with an upstream MPLS labeling associated with the outgoing packet's destination address information, and sends the re-labeled outgoing packet upstream to the upstream device;
   wherein the method further comprises receiving, at the IUD, a first packet from the upstream device, and wherein:
   the upstream device's address information and the downstream MPLS labeling is identified from the first packet;
   the outgoing packet's MPLS labeling is set to the downstream MPLS labeling by copying the first packet into the outgoing packet; and
   the outgoing packet's destination address information is set to the upstream device's address information by swapping the source and destination addresses of the outgoing packet.

2. The method of claim 1 wherein identifying, at the IUD, the upstream device's address information further comprises: receiving, at the IUD, an incoming downstream packet containing the device's address information; and identifying, in the received packet, a unique identifier associated with the IUD.

3. The method of claim 1 wherein identifying, at the IUD, a downstream MPLS labeling further comprises: receiving, at the IUD, an incoming downstream packet containing the downstream MPLS labeling.

4. The method of claim 1 further comprising:
   monitoring, at the IUD, incoming packets of upstream devices received via the downstream input port, and downstream devices received via the upstream input port; and
   copying a monitored incoming packet into the outgoing packet in response to the monitored packet matching filters stored in the IUD.

5. The method of claim 1 wherein sending, at the IUD, the prepared outgoing packet downstream from the IUD includes waiting for an idle period in outgoing downstream traffic from the IUD before sending the prepared outgoing packet.

6. The method of claim 1 wherein the upstream device comprises a controller for managing the IUD.

7. An unaddressed device for inline placement in a Multiprotocol Label Switching (MPLS) network comprising at least one of a logic array, a gate array, an integrated circuit, a field programmable gate array a complex programmable logic device and any combination of those elements for implementing the method according to claim 1.

8. An unaddressed device for testing and monitoring network traffic when in an inline placement in a Multiprotocol Label Switching (MPLS) network, the unaddressed device comprising:
   upstream input and output ports and downstream input and output ports, wherein the unaddressed device does not have a network address in the MPLS network;
   a processor for executing computer readable instructions;
   a non-transitory memory for storing computer readable instructions; and computer readable instructions for:
　receiving a first packet from an upstream device;
　identifying the upstream device's address information;
　identifying a downstream MPLS labeling;
　preparing an outgoing packet, which includes destination address information corresponding to the upstream device's address information, associated with MPLS labeling corresponding to the downstream MPLS labeling; and
　sending the prepared outgoing packet downstream from the unaddressed device via the downstream output port;
whereby in operation, downstream of the unaddressed device, the MPLS network re-labels the outgoing packet in accordance with the outgoing packet's destination address information by replacing the downstream MPLS labeling with an upstream MPLS labeling associated with the outgoing packet's destination address information, and sends the re-labeled outgoing packet upstream to the upstream device;
and wherein:
the upstream device's address information and the downstream MPLS labeling is identified from the first packet;
the outgoing packet's MPLS labeling is set to the downstream MPLS labeling by copying the first packet into the outgoing packet; and
the outgoing packet's destination address information is set to the upstream device's address information by swapping the source and destination addresses of the outgoing packet.

9. The unaddressed device of claim 8 wherein the computer readable instructions for identifying an upstream device's address information comprise further computer readable instructions for receiving an incoming downstream packet containing the upstream device's address information and identifying, in the received packet, a unique identifier associated with the unaddressed device.

10. The unaddressed device of claim 8 wherein the computer readable instructions for identifying a downstream MPLS labeling comprise further computer readable instructions for: receiving an incoming downstream packet containing the downstream MPLS labeling.

11. The unaddressed device of claim 8 comprising further computer readable instructions for:
　receiving a packet from the upstream device containing the upstream device's address information and the downstream MPLS labeling;
　wherein the computer readable instructions for preparing an outgoing packet having destination address information corresponding to the upstream device's address information and MPLS labeling corresponding to the downstream MPLS labeling comprise further computer readable instructions for:
　　copying the packet into the outgoing packet, thereby setting the outgoing packet's MPLS labeling to the downstream MPLS labeling; and
　　swapping the source and destination addresses of the outgoing packet, thereby setting the outgoing packet's destination address information to the upstream device's address information.

12. The unaddressed device of claim 8 comprising further computer readable instructions for:
　monitoring incoming packets of upstream devices received via the downstream input and downstream devices received via the upstream input port; and
　copying a monitored incoming packet into the outgoing packet in response to the monitored packet matching filters stored in the unaddressed device.

13. The unaddressed device of claim 8 wherein the computer readable instructions for sending the prepared outgoing packet downstream from the unaddressed device includes waiting for an idle period in outgoing downstream traffic before sending the prepared outgoing packet.

14. The unaddressed device of claim 8 wherein the upstream device comprises a controller for managing the unaddressed device.

15. A method for an unaddressed inline device (IUD) to send a packet to an upstream device in a Multiprotocol Label Switching (MPLS) network, the method comprising:
　(a) identifying, at the IUD, the upstream device's address information, wherein the IUD includes upstream input and output ports and downstream input and output ports, while not having a network address in the MPLS network, and wherein the upstream device is in communication with the IUD via the downstream input port of the IUD;
　(b) identifying, at the IUD, a downstream MPLS labeling;
　(c) preparing, at the IUD, an outgoing packet, which includes destination address information corresponding to the upstream device's address information, associated with MPLS labeling corresponding to the downstream MPLS labeling;
　(d) sending, at the IUD, the prepared outgoing packet downstream from the IUD via the downstream output port; and
　(e) causing the MPLS network to re-label the outgoing packet in accordance with the outgoing packet's destination address information by replacing the downstream MPLS labeling with an upstream MPLS labeling associated with the outgoing packet's destination address information, and to send the re-labeled outgoing packet upstream to the upstream device;
wherein the method further comprises receiving, at the IUD, a first packet from the upstream device, and wherein:
the upstream device's address information and the downstream MPLS labeling is identified from the first packet;
the outgoing packet's MPLS labeling is set to the downstream MPLS labeling by copying the first packet into the outgoing packet; and
the outgoing packet's destination address information is set to the upstream device's address information by swapping the source and destination addresses of the outgoing packet.

16. The method of claim 15, wherein in step (e), the re-labeling of the outgoing packet and the sending the re-labeled outgoing packet is performed by a node of the MPLS network.

\* \* \* \* \*